US011591076B2

(12) United States Patent
Song et al.

(10) Patent No.: US 11,591,076 B2
(45) Date of Patent: Feb. 28, 2023

(54) INFLATABLE DRONE WITH SHAPE MEMORY ALLOY WIRES

(71) Applicant: Toyota Motor Engineering & Manufacturing North America, Inc., Plano, TX (US)

(72) Inventors: Yuyang Song, Ann Arbor, MI (US); Umesh N. Gandhi, Farmington Hills, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 837 days.

(21) Appl. No.: 16/453,510

(22) Filed: Jun. 26, 2019

(65) Prior Publication Data
US 2020/0407053 A1 Dec. 31, 2020

(51) Int. Cl.
*B64C 27/20* (2006.01)
*B64C 39/02* (2023.01)
*B64C 25/32* (2006.01)
*F03G 7/06* (2006.01)

(52) U.S. Cl.
CPC ............ *B64C 27/20* (2013.01); *B64C 25/32* (2013.01); *B64C 39/024* (2013.01); *F03G 7/065* (2013.01); *B64C 2025/325* (2013.01); *B64C 2201/027* (2013.01); *B64C 2201/108* (2013.01)

(58) Field of Classification Search
CPC ....... B64C 27/20; B64C 25/32; B64C 39/024; B64C 2025/325; B64C 2201/027; B64C 2201/108; B64C 1/34; B64C 2201/042; F03G 7/065
See application file for complete search history.

(56) References Cited

U.S. PATENT DOCUMENTS

| 2,420,433 | A | * | 5/1947 | Kraaymes | ................. | B64C 3/54 244/218 |
| 2,550,278 | A | * | 4/1951 | Makhonine | ............... | B64C 3/54 244/218 |

(Continued)

FOREIGN PATENT DOCUMENTS

| WO | 2015000088 A1 | 1/2015 |
| WO | 2017148923 A1 | 9/2017 |
| WO | 2018122830 A1 | 7/2018 |

*Primary Examiner* — Medhat Badawi
(74) *Attorney, Agent, or Firm* — Christopher G. Darrow; Darrow Mustafa PC (57) ABSTRACT

In one embodiment, a drone is provided with several inflatable tubes that each connect a propeller component to a body of the drone. In order to increase the handling of the drone, a patch is placed on the top surface of each inflatable tube that includes some number of shape memory alloy wires. The shape memory alloy wires shrink and become rigid when an electric current is applied to them. The optimal locations on each tube to place the patches, and the shape of the patches, is determined using a topology optimization. Later, the wires in the patches can be selectively activated or deactivated by an operating entity to provide an additional means to control the drone. Additionally, the drone is equipped with several landing arms which may include a shape memory alloy torsion coil spring to help the arm deployment during landing.

20 Claims, 6 Drawing Sheets

(56) References Cited

U.S. PATENT DOCUMENTS

| | | | | |
|---|---|---|---|---|
| 2,743,072 | A * | 4/1956 | Emmi | B64C 3/54 244/6 |
| 4,824,053 | A * | 4/1989 | Sarh | B64C 3/54 244/49 |
| 6,151,897 | A * | 11/2000 | Baumbick | F03G 7/065 60/527 |
| 6,834,835 | B1 * | 12/2004 | Knowles | F03G 7/065 244/46 |
| 7,728,267 | B2 * | 6/2010 | Sanderson | B64C 27/46 244/99.8 |
| 7,823,382 | B2 * | 11/2010 | Ukpai | H02N 2/101 60/527 |
| 7,939,178 | B2 * | 5/2011 | Sar | B64C 5/18 148/402 |
| 7,980,074 | B2 * | 7/2011 | Gao | H02N 2/10 60/527 |
| 8,016,249 | B2 * | 9/2011 | Sar | F01D 5/28 244/218 |
| 8,056,853 | B2 * | 11/2011 | Eisentraut | B64C 3/54 244/49 |
| 8,262,032 | B2 * | 9/2012 | Sanderson | B64C 3/48 416/142 |
| 8,573,535 | B2 * | 11/2013 | Sanderson | B64C 3/26 244/218 |
| 8,733,097 | B2 * | 5/2014 | Mankame | F03G 7/065 60/527 |
| 9,139,310 | B1 * | 9/2015 | Wang | B64C 39/024 |
| 9,448,562 | B1 * | 9/2016 | Sirang | G05D 1/0676 |
| 9,469,391 | B1 * | 10/2016 | Dong | B64C 3/385 |
| 9,499,252 | B2 * | 11/2016 | Lassen | B64C 3/56 |
| 9,522,732 | B1 * | 12/2016 | Froloff | B64C 39/024 |
| 9,527,588 | B1 * | 12/2016 | Rollefstad | B64C 39/024 |
| 9,540,101 | B2 * | 1/2017 | Paduano | B64D 43/00 |
| 9,561,871 | B2 * | 2/2017 | Sugumaran | A01D 41/12 |
| 9,650,133 | B2 * | 5/2017 | Fisher | B64F 1/005 |
| 9,873,524 | B2 * | 1/2018 | Fisher | B64F 1/12 |
| 9,975,633 | B1 * | 5/2018 | Johnson | B64C 3/00 |
| 10,099,786 | B1 * | 10/2018 | Bar-Zeev | B64C 39/024 |
| 10,518,901 | B2 * | 12/2019 | Fisher | B64C 29/02 |
| 10,626,846 | B2 * | 4/2020 | Herrig | F03D 1/0675 |
| 11,168,487 | B2 * | 11/2021 | Wankewycz | H02J 7/00 |
| 11,174,848 | B1 * | 11/2021 | Rutland | F03G 7/065 |
| 2014/0217230 | A1 * | 8/2014 | Helou, Jr. | B64C 39/024 244/17.17 |
| 2014/0339355 | A1 * | 11/2014 | Olm | B64C 39/024 244/17.23 |
| 2015/0069968 | A1 * | 3/2015 | Pounds | B60L 53/16 320/109 |
| 2015/0259066 | A1 * | 9/2015 | Johannesson | B64C 27/08 244/17.27 |
| 2016/0001883 | A1 * | 1/2016 | Sanz | B64C 39/024 244/17.23 |
| 2016/0144982 | A1 * | 5/2016 | Sugumaran | B64C 25/32 244/108 |
| 2017/0190443 | A1 * | 7/2017 | Fisher | B64C 29/02 |
| 2018/0135596 | A1 * | 5/2018 | Herrig | F03D 7/0228 |
| 2018/0194491 | A1 * | 7/2018 | Fisher | B64C 39/024 |
| 2018/0281933 | A1 * | 10/2018 | Davis | B64C 25/04 |
| 2019/0127066 | A1 * | 5/2019 | Tournet | B64C 39/024 |
| 2020/0281670 | A1 * | 9/2020 | Moskowitz | A61B 34/32 |
| 2022/0063798 | A1 * | 3/2022 | Johnson | B64C 39/024 |

\* cited by examiner

INFLATABLE DRONE WITH SHAPE MEMORY ALLOY WIRES

TECHNICAL FIELD

The subject matter described herein relates, in general, to systems and methods for improving the handling of drones with inflatable structures or tubes, and in particular, to improving the handling of drones using shape memory alloy (SMA) wires.

BACKGROUND

Multirotor helicopters, commonly referred to as drones, are a popular type of unmanned aerial vehicle. Typically, these drones include four rotors connected to a frame, along with one or more processors, accelerometers, global positioning system, and cameras. Drones may be operated by using wireless controllers, or may be autonomously controlled by software executed by the one or more processors.

In order to improve overall performance (i.e., increase lifting capability, range, or speed), many have tried to reduce the weight of drones. One approach has been to replace some parts of the frame of the drone with inflatable components. While this reduces the weight of the drones, there are drawbacks associated with this approach including reducing the rigidness of the drone frame. This reduction in rigidness may lead to a reduction in the overall controllability and handling of the drone, as well as reducing the overall carrying capacity of the drone.

Therefore, what is needed is a way to improve the rigidness and handling of drones with inflatable components.

SUMMARY

In one embodiment, a drone is provided with four inflatable tubes that each connect a propeller component to a body of the drone. In order to increase the handling of the drone, a patch is placed on the top surface of each inflatable tube that includes some number of shape memory alloy wires. The shape memory alloy wires shrink and become rigid when an electric current is applied to them. The optimal locations on each tube to place the patches, and the shape of the patches, is determined using a topology optimization. Later, the wires in the patches can be selectively activated or deactivated by a pilot or an operating entity to provide an additional means to control the drone.

In one embodiment, a drone is provided. The drone includes: a body; a control system located within the body; a plurality of tubes, wherein each tube comprises a first end, a second end, and a surface, and wherein each tube is connected to the body by the first end of the tube; a plurality of propeller units, wherein each propeller unit is connected to the second end of a different tube of the plurality of tubes; and a plurality of patches, wherein each patch is applied to the surface of a different tube of the plurality of tubes according to a topology optimization.

Embodiments may include some or all of the following features. Each patch of the plurality of patches may include shape memory alloy wires, and the control system may be configured to cause an electrical current to be received by the shape memory alloy wires of at least one patch of the plurality of patches. The shape memory alloy wires of the at least one patch of the plurality of patches may shrink when the electrical current is received. The control system may be configured to receive a signal to increase the controllability of the drone, and to cause the electrical current to be received by the shape memory alloy wires of the at least one patch in response to receiving the signal. The control system may be configured to receive a signal to perform a maneuver, and to cause the electrical current to be received by the shape memory alloy wires of the at least one patch in response to receiving the signal. The maneuver may be to change the altitude of the drone, turn the drone, or rotate the drone. Each patch of the plurality of patches may include shape memory alloy wires, and the control system may be configured to cause an electrical current to stop being received by the shape memory alloy wires of at least one patch of the plurality of patches. The plurality of tubes may include four tubes. The plurality of tubes may be inflatable tubes. The drone may further include a landing component connected to the body. The landing component may include a rod; and a plurality of landing arms, wherein each landing arm comprises a first end and a second end, further wherein each landing arm is moveably connected to the rod at the first end, and further wherein the control system is configured to cause the second ends of each landing arm to move towards the rod or away from the rod. Each landing arm may further include a shape memory alloy torsion coil spring at the first end, and the control system configured to cause the second end of each landing arm to move away from the rod comprises the control system configured to cause an electrical current to be received by each shape memory alloy torsion coil spring. Each landing arm may further include a shape memory alloy torsion coil spring at the first end, and the control system configured to cause the second end of each landing arm to move towards the rod comprises the control system configured to stop an electrical current from being received by each shape memory alloy torsion coil spring. The drone may further include a battery, wherein the rod is adapted to be received by a landing base, wherein each landing arm is adapted to receive electrical current from the landing base when the rod is received by the landing base, and further wherein each landing arm is adapted to provide the received current to the battery.

In one embodiment, a drone is provided. The drone may include: a body; a control system located within the body; and a landing component connected to the body. The landing component may include: a rod; and a plurality of landing arms, wherein each landing arm comprises a first end and a second end, further wherein each landing arm is moveably connected to the rod at the first end, and further wherein the control system is configured to cause the second ends of each landing arm to move towards the rod or away from the rod.

Embodiments may include some or all of the following features. Each landing arm may further include a shape memory alloy torsion coil spring at the first end, and the control system configured to cause the second end of each landing arm to move away from the rod comprises the control system configured to cause an electrical current to be received by each shape memory alloy torsion coil spring. Each landing arm may further include a shape memory alloy torsion coil spring at the first end, and the control component configured to cause the second end of each landing arm to move towards the rod comprises the control system configured to stop an electrical current from being received by each shape memory alloy torsion coil spring. The drone may further include a battery, wherein the rod is adapted to be received by a landing base, wherein each landing arm is adapted to receive electrical current from the landing base when the rod is received by the landing base, and further wherein each landing arm is adapted to provide the received current to the battery. The drone may further include: a plurality of tubes, wherein each tube comprises a first end, a second end, and a surface, and wherein each tube is connected to the body by the first end of the tube; a plurality of propeller units, wherein each propeller unit is connected to the second end of a different tube of the plurality of tubes; and a plurality of patches, wherein each patch is applied to the surface of a different tube of the plurality of tubes based on a topology optimization. Each patch of the plurality of patches may include shape memory alloy wires. Each tube of the plurality of tubes may be inflatable.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the handling of drones with inflatable structures is provided. Patches that include shape memory alloy wires are attaches to the top surfaces of inflatable structures or tubes. The patches improve the rigidity of the inflatable tubes, and without adding unnecessary weight to the drone. The shape memory alloy wires in a patch shrink when an electrical current is applied, causing the propeller components connected to the affected inflatable structure drone to be pulled towards the body of the drone. This provides an additional means for a pilot or operator to control the drone, and therefore increases the handling of the done.

In addition, as will be described further below, the shape memory alloy wires can be further used to provide a novel landing structure for drones. One or more landing arms are attached to the drone using torsion coil springs that include shape memory alloy wires. When no current is applied to the torsion coil springs, the spring forces cause the landing arms to retract or fold against the body of the drone. When current is applied to the torsion coil springs, the spring force is overcome by the shrinking of the shape memory alloy wires and the landing arms are able to extend from the body of the drone.

Figure 1:
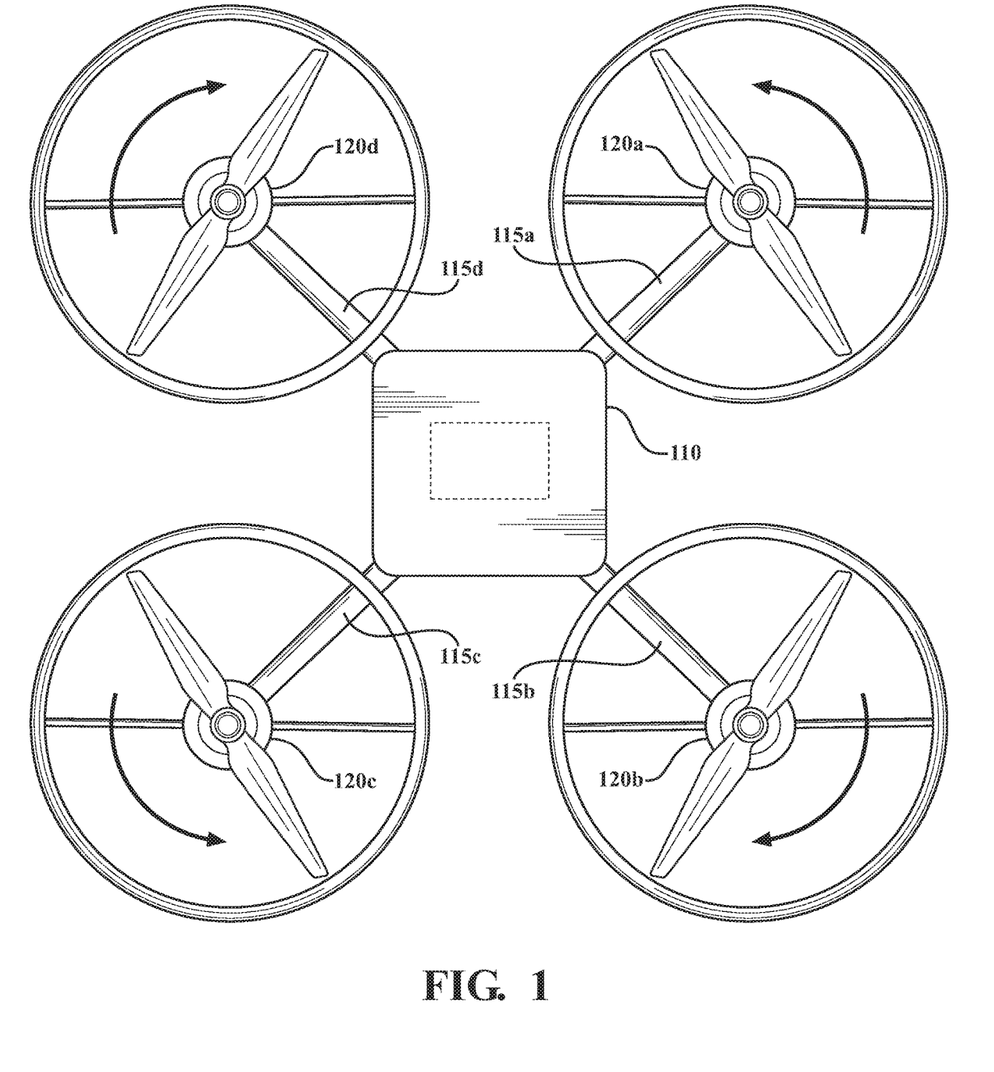
FIG. 1 illustrates one embodiment of a drone within which systems and methods disclosed herein may be implemented.

With regards to FIG. 1 an overhead view of a drone 100 is illustrated. As shown the drone 100 includes a body 110 connected to four tubes 115 (i.e., the tubes 115a, b, c, and d). The tubes 115 may be inflatable tubes and may be constructed from a variety of materials such as Dynema fabric CT5. Other fabrics may be used. The tubes 115 may each be approximately one foot in length and may have a diameter of approximately two inches. Other sizes may be used. Note that while the tubes 115 are illustrated and described as having a generally cylindrical shape, the embodiments are not limited to those shapes. Other inflatable shapes and structures may be used in place of the tubes 115.

Each tube 115 may have a surface, a first end, and a second end. The first end of each tube 115 is attached to the body 110 of the drone 100. The second end of each tube 115 is attached to a propeller unit 120. Each propeller unit 120 may include at least a motor and a propeller, and may provide the lifting force that allows the drone to fly in the air. In the example shown, the second end of the tube 115a is attached to the propeller unit 120a, the second end of the tube 115b is attached to the propeller unit 120b, the second end of the tube 115c is attached to the propeller unit 120c, and the second end of the tube 115d is attached to the propeller unit 120d. While only four tubes 115 and propeller units 120 are shown, it is for illustrative purposes only; there is no limit to the number of tubes 115 and propeller units 120 that may be supported.

The body 110 may include various components that are used to control and operate the drone 100. For example, the body 110 may include one or more processors, accelerometers, global positioning systems, cameras, batteries, and wireless communication components. Other sensors and components may be supported. The one or more processors of the body 110 may execute navigation software that may control the operations of the drone 100. The drone 100 may operate autonomously, or may be controlled completely or partially by a pilot or operator. For example, a pilot may provide commands to the drone 100 via the wireless communication components. In another example, an automatic landing can be initiated by sensing the drone's proximity to a landing area.

The propeller units 120 may be electrically connected to the body 110. The body 110 may control the drone 100 (e.g., control the speed, direction, altitude, and rotation of the drone 100) by selectively adjusting the speed of each of the propeller units 120 relative to each other. Any method of technique for controlling a drone 100 may be used.

As may be appreciated, because each of the tubes 115 is inflatable, they may be caused to flex when certain maneuvers of operations are performed. For example, when the drone 100 is performing the operation of increasing altitude in an upward direction perpendicular to the tubes 115, each tube 115 may tend to bend upwards and inwards towards the body 110 as the propeller units 120 apply a lifting force to the second ends of the tubes 115. This flexing of the tubes 115 may lead to the instability of the drone 100, and may lessen the overall performance of the drone 100.

Figure 2:
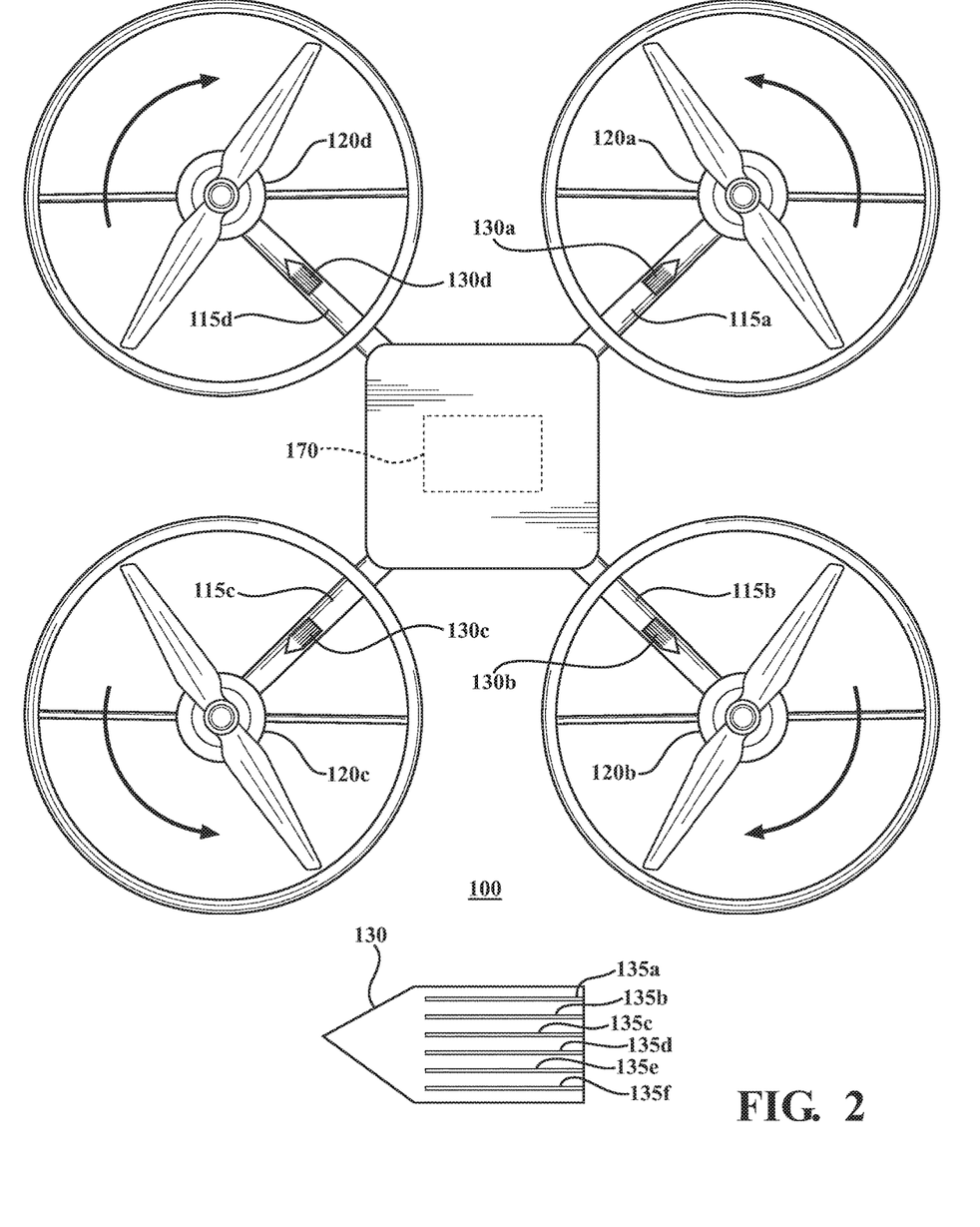
FIG. 2 illustrated an example drone that solves many of the problems associated with inflatable tubes.

FIG. 2 illustrates an example drone 100 that solves many of the problems associated with inflatable tubes 115. In the example shown, a plurality of patches 130 have been applied to the surfaces of the tubes 115. Each patch 130 includes a plurality of shape memory alloy wires 135 (i.e., the wires 135a-f). A shape memory alloy wire has the property that it shrinks when an electrical current is applied to the wire. Note that while the patch 130 is shown as having six wires 135, it is for illustrative purposes only, there is no limit to the number of wires 135 that may be used in a patch 130.

In some embodiments, the shape of the patch 130 and its placement on the surface of a tube 115 may be determined using a topology optimization. For example, a topology optimization may be performed on the tube 115 using boundary conditions similar to those used for cantilever bending. This topology optimization results in an optimized shape and placement for the patch 130. A patch 130 is then created using fabric and placed on the surface of the tube 115 according to the optimization. Depending on the embodiment, the patch 130 may be created using a material such as Dynema fabric CT5 pressure sensitive tape, which can be directly attached to the tube using the adhesives in one side of the tape. Other materials may be used.

The patches 130, due to their shape and placement, result in an increased rigidity of the tubes 115. Because the patches 130 were designed and placed using a topology optimization, the rigidity of each tube 115 is increased while any additional weight due to the patches 130 is minimized.

The drone 100 of FIG. 2 further includes a control system 170 that controls the flow electricity to the wires 135 of each patch 130. As described above, the wires 135 in a patch 130 shrink when an electrical current is provided. When the patch 130 is applied to the top of a tube 115, this shrinking may result in a force that generally pulls the propeller unit 120 attached to the second end of the tube 115 upward and towards the body 110 attached to the first end of the tube 115. Accordingly, the control system 170 can control this force by selectively providing electrical current to the various patches 130.

In some embodiments, the control system 170 can control the amount of current that is provided to each patch 130. The amount that the wires 135 shrink, and the resulting force, may be proportional to the amount of current that is provided. Accordingly, by controlling the amount of current that is received by the patches 130, the control system 170 can control the amount of force that is applied to the tubes 115 by the patches 130.

The patches 130 and the control system 170 solves many of the problems associated with inflatable drones. First, by designing and placing the patches 130 on the tubes 115 based on a topology optimization, the rigidity of the tubes 115 is greatly improved while the amount of excess weight due to the patches 130 is minimized.

Second, by selectively controlling which patches 130 receive current, and what amount, the control system 170 is able to increase the maneuverability and handling of the drone 100. As described above, the drone 100 is controlled by changing the speed of each of the propeller units 120 relative to each other to achieve the desired movement or maneuver. For example, the drone 100 may move forward by having the propeller units 120d and 120a run at a first speed, and the propeller units 120c and 120b run at a second speed that is greater than the first speed.

When current is applied to the patch 130 of a tube 115, the lifting properties of the attached propeller unit 120 is changed due to the force caused by the shrinking of the wires 135 in the patch 130. Accordingly, the patches 130 and the wires 135 provide another way that the motion of the drone 100 can be controlled in addition to the relative speeds of the propeller units 120, which may improve the handling and maneuverability of the drone 100.

Figure 3A:
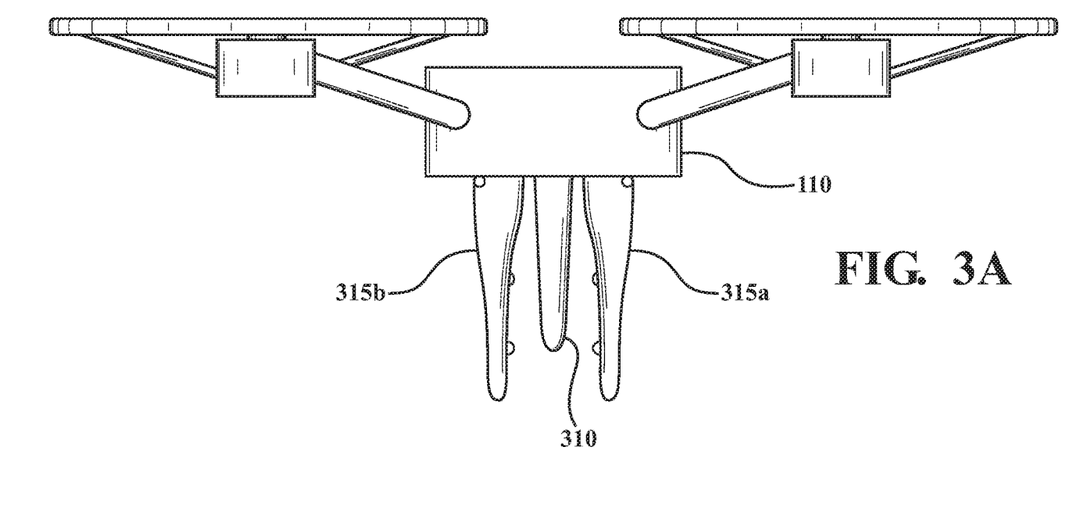
FIGS. 3a and 3b are illustrations of example landing components that may be incorporated into the drone.
Figure 3B:
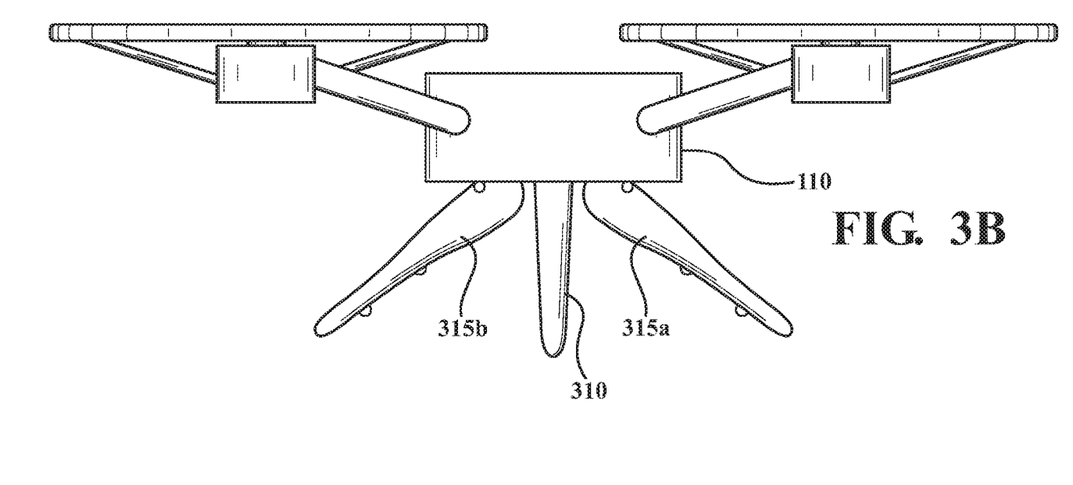

FIGS. 3a and 3b are illustrations of example landing components that may be incorporated into the drone 100. Each landing component may be attached to the underside of the body 110 of the drone 100 and may include a plurality of landing arms 315 (i.e., landing arms 315a and 315b) arranged about a rod 310. As will be described further in FIG. 4, the rod 310 may serve to guide the landing component onto a landing base.

Each landing arm 315 may have a first end and a second end. The first end of the landing arm 315 may be a torsion coil spring with a spring force that causes the second end of the landing arm 315 to be held close to the rod 310 such that the rod 310 and the landing arm 315 are substantially parallel or even joined together for a more streamlined configuration. FIG. 3a shown the landing component when it is not deployed and the landing arms 315a and 315b are held against the rod 310 by the torsion coil springs.

To facilitate deployment of the landing component, the torsion coil spring of each landing arm 315 may include shape memory alloy wires that shrink when an electric current is applied to the wires. This shrinking overcomes some or all of the spring force of the torsion coil spring and causes the landing arms 315 to deploy and move away from the rod 310. FIG. 3b illustrates the landing arms 315a and 315b when deployed. As shown, the second end of each landing arm 315 has moved away from the rod 310.

Figure 4A:
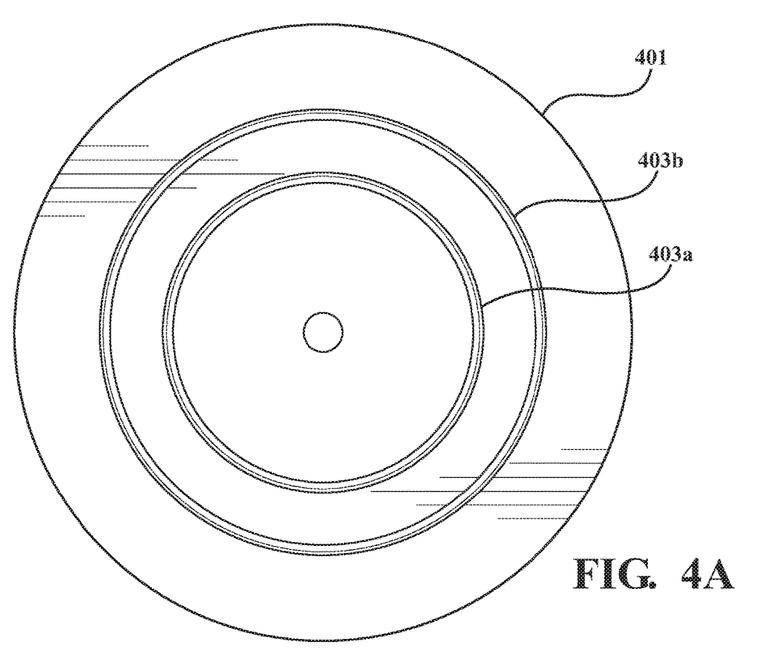
FIGS. 4a and 4b are illustrations of example landing bases and landing components.
Figure 4B:
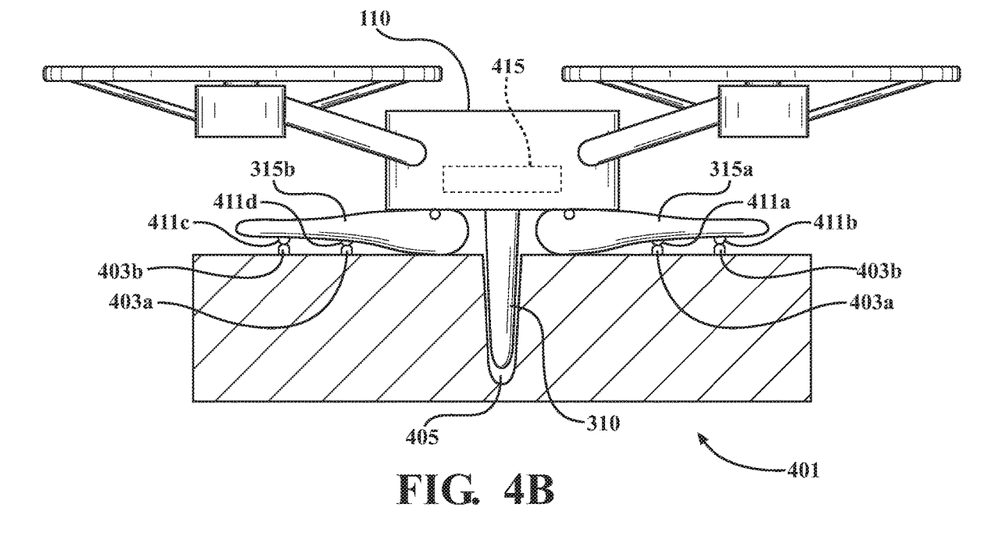

Continuing to FIGS. 4a and 4b, the landing arms 315 may allow the drone 100 to land on and dock with a landing base 401. The landing base 401 includes a hole 405 that is adapted to receive the rod 310 of the landing component. Depending on the embodiment, when the drone 100 approaches the landing base 401, the control system 170 may receive a signal from the landing base 401 that causes the control system 170 to apply a current to the landing arms 315 causing them to deploy. As the drone 100 maneuvers the rod 310 into the hole 405, the control system 170 may deactivate the propeller units 120 resulting in further extension of the landing arms 315 as the weight of the drone 100 forces them against the landing base 401.

In some embodiments, the landing base 401 may have a plurality of charging rings 403 that are adapted to provide power to the drone 100 when the drone 100 is connected to the landing base 401. The drone 100 may use the power from the landing base 401 to charge a battery associated with the drone 100 or to perform other functions.

To facilitate the reception of power from the landing base 401, each landing arm 315 may include a plurality of terminals 411. The terminals 411 are arranged on the landing arms 315 such that they each connect with a corresponding charging ring 403 when the drone 100 docks with the landing base 401. In the example shown in FIG. 4b, the landing arm 315a includes the terminals 411a and 411b that are arranged to connect with the charging rings 403a and 403b, respectively. The landing arm 315b includes the terminals 411c and 411d that are arranged to connect with the charging rings 403b and 403a, respectively. Note that embodiments may have more or fewer charging rings 403 and terminals 411.

The drone is capable of landing on surfaces other than the landing base 401 because the rod 310 is typically shorter than the landing arms 315, and also because the perimeter of the landing arms 315a and 315b when held against the rod 310 by the torsion coil springs can still provide a surface contact area sufficient for steady landing (as shown in FIG. 3A).

Figure 5:
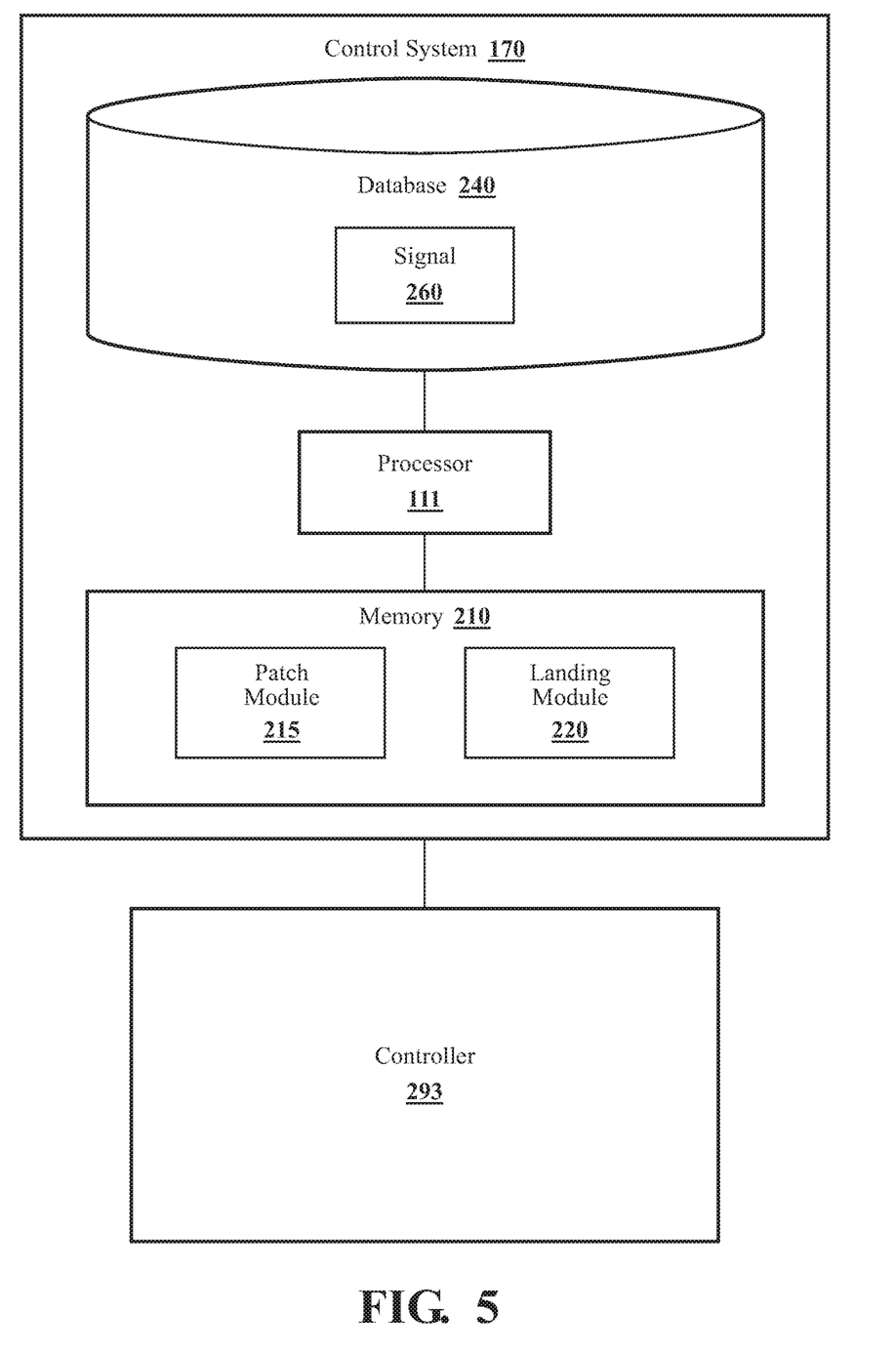
FIG. 5 is an illustration of an example control system.

With reference to FIG. 5, one embodiment of the control system 170 is further illustrated. The control system 170 is shown as including a processor 111 from the drone 100 of FIG. 2. Accordingly, the processor 111 may be a part of the control system 170, the control system 170 may include a separate processor from the processor 111 of the drone 100, or the control system 170 may access the processor 111 through a data bus or another communication path. It should be appreciated, that while the control system 170 is illustrated as being a single contained system, in various embodiments, the control system 170 is a distributed system that is comprised of components that can be provided as a centralized server, a cloud-based service, and so on.

In one embodiment, the control system 170 includes a memory 210 that stores a patch module 215 and a landing module 220. The memory 210 is a random-access memory (RAM), read-only memory (ROM), a hard-disk drive, a flash memory, or other suitable memory for storing the modules 215 and 220. The modules 215 and 220 are, for example, computer-readable instructions that when executed by the processor 111 cause the processor 111 to perform the various functions disclosed herein. Moreover, as previously noted, in various embodiments, one or more aspects of the control system 170 are implemented as cloud-based services, and so on. Thus, one or more modules of the control system 170 may be located remotely from other components and may be implemented in a distributed manner.

Furthermore, in one embodiment, the control system 170 includes the database 240. The database 240 is, in one embodiment, an electronic data structure stored in the memory 210 or another data store and that is configured with routines that can be executed by the processor 111 for analyzing stored data, providing stored data, organizing stored data, and so on. Thus, in one embodiment, the database 240 stores data used by the modules 215 and 220 in executing various functions. In one embodiment, the database 240 includes a signal along with, for example, other information that is used and/or generated by the modules 215 and 220. Of course, in further embodiments, the various information may be stored within the memory 210 or another suitable location.

The patch module 215 is configured to selectively cause electrical current to be received by the wires 135 of each patch 130. As described above, each inflatable tube 115 may have a patch 130 on its top surface that includes a plurality of wires 135. When an electrical current is received by the wires 135, the wires 135 may shrink, which may result in a force that pulls the propeller unit 120 associated with the inflatable tube 115 that includes the patch 130 towards the body 110.

Each patch 130 may be electrically connected to a battery, or other power source, associated with the drone 100. The patch module 215 may control a switch that allows electrical current to be received by the patches 130 from the battery. Depending on the embodiment, the patch module 215 may control a separate switch for each of the patches 130, or one or more patches 130 may share a single switch. In addition, the patch module 215 may selectively control the amount of electrical current that is received by each patch 130.

In some embodiments, the patch module 215 may determine to allow a patch 130 to receive current in response to receiving a signal 260. Depending on the embodiment, the signal 260 may be received by the patch module 215 from a controller 293. For example, a pilot or operator of the drone 100 may press or select a button that indicates that they would like to apply current to a selected patch 130. In response, the controller 293 may generate a signal 260 that is wirelessly transmitted to the patch module 215. Upon receipt of the signal 260 the patch module 215 may cause current to flow to the selected patch 130. The patch module 215 may let current flow to the selected patch 130 until a new signal 260 is received from the controller 293 indicating that the pilot would like to disable the current, or after a predetermined amount of time has passed.

In some embodiments, the patch module 215 may selectively enable or disable electrical current from being received by a patch 130 upon detection of certain maneuvers or operations by the pilot of the drone 100. The maneuvers may include operations such as turning the drone 100 in a particular direction, causing the drone 100 to climb or descend, and causing the drone 100 to rotate. As described previously, enabling electrical current to a particular patch 130 of a tube 115 may cause the associated wires 135 to shrink and apply a force to the propeller unit 120 attached to the tube 115. This force results in a change in the direction of the lifting force that is applied by the propeller unit 120. Accordingly, depending on the maneuver being performed, the patch module 215 may selectively enable or disable electrical current to some or all of the patches 130 when doing so would benefit the particular maneuver being performed by the drone 100.

In some embodiments, the patch module 215 may selectively enable or disable electrical current from being received by a patch 130 upon detection of certain environmental or weather conditions. For example, the patch module 215 may detect a wind gust. Depending on the direction and magnitude of the wind gust, the patch module 215 may selectively enable or disable electrical current to some or all of the patches 130 when doing so would improve the stability of the drone 100 in view of the wind gust.

The landing module 220 may selectively deploy or retract the landing arms 315 of the landing component. As described above, the landing module 220 may deploy the landing arms 315 by allowing electrical current to be received by the shape memory alloy torsion springs associated with each landing arm 315. The landing module 220 may retract the landing arms 315 by removing or stopping the electrical current from being received by the shape memory allow torsion springs.

In some embodiments, the landing module 220 may determine to deploy or retract the landing arms 315 of the landing component in response to receiving a signal 260. Depending on the embodiment, the signal 260 may be received by the landing module 220 from the controller 293. For example, a pilot or operator of the drone 100 may press or select a button that indicates that they would like to deploy the landing arms 315. In response, the controller 293 may generate a signal 260 that is wirelessly transmitted to the landing module 220. Upon receipt of the signal 260, the landing module 220 may cause current to flow to the shape memory alloy torsion coil springs associated with the landing arms 315. The landing module 220 may let current flow to the shape memory coil springs until a new signal 260 is received from the controller 293 indicating that the pilot would like to retract the landing arms 315.

In some embodiments, the landing module 220 may receive the signal to deploy or retract the landing arms 315 from the landing base 401. For example, the landing base 401 may emit a low powered signal 260 that may be received by the landing module 220 when the drone 100 is approaching the landing base 401. Upon receipt of the signal 260 the landing module 220 may deploy the landing arms 315, and may dock with, or land on, the landing base 401. Depending on the embodiment, the drone 100 may automatically return to the landing base 401 when its associated battery charge falls below a threshold charge.

Figure 6:
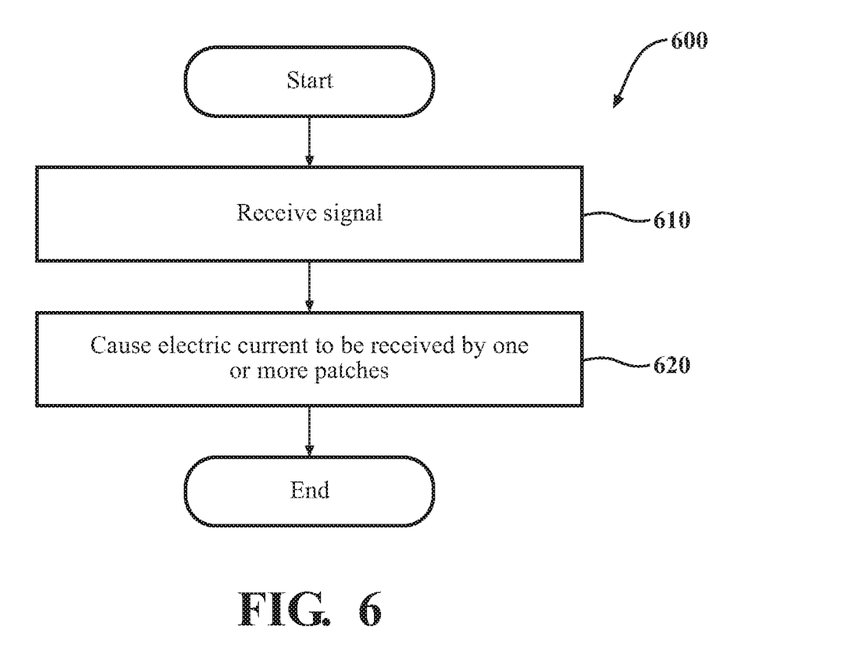
FIG. 6 illustrates a flowchart of a method that is associated causing electric current to be received by one or more patches.

FIG. 6 illustrates a flowchart of a method 600 that is associated causing electric current to be received by one or more patches 130. The method 600 will be discussed from the perspective of the control system 170 of FIG. 5. While the method 600 is discussed in combination with the control system 170, it should be appreciated that the method 600 is not limited to being implemented within the control system 170 but is instead one example of a system that may implement the method 600.

At 610, the patch module 215 receives a signal 260. The signal 260 may be an indication to cause electric current to flow to one or more patches 130. Each patch 130 may include one or more shape memory alloy wires 135 that shrink when an electric current is received. Depending on the embodiment, the signal 260 may identify which of the one or more patches 130 that may receive the electric current, as well as how much current that each patch 130 may receive.

In one embodiment, the signal 260 may be received from a controller 293 operated by a pilot or operator of the drone 100. In other embodiments, the signal 260 may be received in response to the drone 100 performing a particular maneuver or weather condition.

At 620, the patch module 215 causes an electric current to be receive by one or more of the patches 130. The patch module 215 may cause an electric current to be received by the one or more patches 130 identified by the signal 260, for example.

Figure 7:
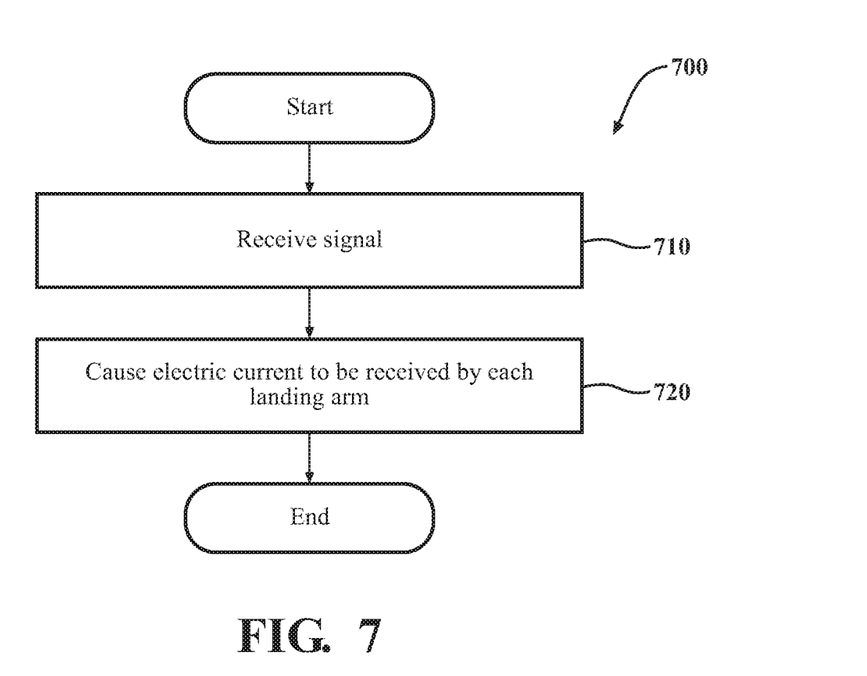
FIG. 7 illustrates a flowchart of a method that is associated with deploying one or more landing arms of a drone.

FIG. 7 illustrates a flowchart of a method 700 that is associated with deploying one or more landing arms of a drone 100. The method 700 will be discussed from the perspective of the control system 170 of FIG. 5. While the method 700 is discussed in combination with the control system 170, it should be appreciated that the method 700 is not limited to being implemented within the control system 170 but is instead one example of a system that may implement the method 700.

At 710, the landing module 220 receives a signal 260. The signal 260 may be an indication to deploy one or more landing arms 315 of a landing component. In one embodiment, the signal 260 may be received by a pilot or operator of the drone 100 through a controller 293. In another embodiment, the signal 260 may be received from the landing base 401. For example, the landing base 401 may emit a low-powered signal 260 that may be received by the landing module 220 when the drone 100 is close to the landing base 401.

At 720, the landing module 220 causes electrical current to be received by each landing arm 315. The electrical current may cause each landing arm 315 to deploy by causing the shape memory alloy tensor springs to overcome the spring force that keeps them lowered against the rod 310. Once the landing arms 315 are deployed, the drone 100 may land on the landing base 401 and recharge the battery of the drone 100.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A drone comprising:
   a body;
   a control system located within the body;
   a plurality of tubes, wherein each tube comprises a first end, a second end, and a surface, and wherein each tube is connected to the body by the first end of the tube;
   a plurality of propeller units, wherein each propeller unit is connected to the second end of a respective one of the plurality of tubes;
   a plurality of patches, wherein each patch is applied to the surface of a respective one of the plurality of tubes; and
   a landing component connected to the body wherein the landing component comprises:
      a rod; and
      a plurality of landing arms, wherein each landing arm comprises a first end and a second end, further wherein each landing arm is moveably connected to the rod at the first end, and further wherein the control system is configured to cause the second end of each landing arm to move towards the rod or away from the rod.

2. A drone comprising: The drone of claim 1, wherein each patch comprises shape memory alloy wires, wherein the control system is configured to control the drone by activating or deactivating the shape memory alloy wires.

3. The drone of claim 2, wherein the control system is configured to cause the shape memory alloy wires of at least one patch of the plurality of patches to receive an electrical current.

4. The drone of claim 3, wherein the shape memory alloy wires of the at least one patch of the plurality of patches shrink when the electrical current is received.

5. The drone of claim 3, wherein the control system is configured to receive a signal to increase controllability of the drone, and to cause the shape memory alloy wires of the at least one patch to receive the electrical current in response to receiving the signal.

6. The drone of claim 3, wherein the control system is configured to receive a signal to perform a maneuver, and to cause the shape memory alloy wires of the at least one patch to receive the electrical current in response to receiving the signal.

7. The drone of claim 6, wherein the maneuver is to change an altitude of the drone, turn the drone, or rotate the drone.

8. The drone of claim 2, wherein the control system is configured to cause the shape memory alloy wires of at least one patch of the plurality of patches to stop receiving an electrical current.

9. The drone of claim 2, wherein the plurality of tubes comprises four or more tubes.

10. The drone of claim 2, wherein the plurality of tubes are inflatable tubes.

11. The drone of claim 1, wherein each landing arm further comprises a shape memory alloy torsion coil spring at the first end, and the control system configured to cause the second end of each landing arm to move away from the rod comprises the control system configured to cause each shape memory alloy torsion coil spring to receive an electrical current.

12. The drone of claim 1, wherein each landing arm further comprises a shape memory alloy torsion coil spring at the first end, and the control system configured to cause the second end of each landing arm to move towards the rod comprises the control system configured to stop each shape memory alloy torsion coil spring from receiving an electrical current.

13. The drone of claim 1, wherein the drone further comprises a battery, wherein the rod is adapted such that a landing base may receive the rod, wherein each landing arm is adapted to receive electrical current from the landing base when the landing base receives the rod, and further wherein each landing arm is adapted to provide the received current to the battery.

14. A drone comprising:
   a body;
   a control system located within the body; and
   a landing component connected to the body and comprising:
      a rod; and
      a plurality of landing arms, wherein each landing arm comprises a first end and a second end, further wherein each landing arm is moveably connected to the rod at the first end, and further wherein the control system is configured to cause the second ends of each landing arm to move towards the rod or away from the rod.

15. The drone of claim 14, wherein each landing arm further comprises a shape memory alloy torsion coil spring at the first end, and the control system configured to cause the second end of each landing arm to move away from the rod comprises the control system configured to cause each shape memory alloy torsion coil spring to receive an electrical current.

16. The drone of claim 14, wherein each landing arm further comprises a shape memory alloy torsion coil spring at the first end, and the control system configured to cause the second end of each landing arm to move towards the rod comprises the control system configured to stop each shape memory alloy torsion coil spring from receiving an electrical current.

17. The drone of claim 14, wherein the drone further comprises a battery, wherein the rod is adapted such that a landing base may receive the rod, wherein each landing arm is adapted to receive electrical current from the landing base when the landing base receives the rod, and further wherein each landing arm is adapted to provide the received current to the battery.

18. The drone of claim 14, wherein the drone further comprises:
   a plurality of tubes, wherein each tube comprises a first end, a second end, and a surface, and wherein each tube is connected to the body by the first end of the tube;
   a plurality of propeller units, wherein each propeller unit is connected to the second end of a respective one of the plurality of tubes; and
   a plurality of patches, wherein each patch is applied to the surface of a respective one of the plurality of tubes.

19. The drone of claim 18, wherein each patch of the plurality of patches comprises shape memory alloy wires.

20. The drone of claim 18, wherein each tube of the plurality of tubes is inflatable.

* * * * *